United States Patent [19]

Saito

[11] 4,233,503
[45] Nov. 11, 1980

[54] AUTOMATIC FOCUS ADJUSTING SYSTEM
[75] Inventor: Koji Saito, Sayama, Japan
[73] Assignee: Nihon Beru-Haueru Kabushiki Kaisha (Bell & Howell Japan, Ltd.), Tokyo, Japan
[21] Appl. No.: 17,637
[22] Filed: Mar. 5, 1979
[51] Int. Cl.³ .......................................... G03B 13/20
[52] U.S. Cl. .................................... 250/204; 354/25
[58] Field of Search ................. 250/204, 201; 354/25; 356/4

[56] References Cited
U.S. PATENT DOCUMENTS
4,174,892 11/1979 Osawa ............................. 250/204 X Primary Examiner—David C. Nelms
Assistant Examiner—Darwin R. Hostetter
Attorney, Agent, or Firm—Robert E. Wagner

[57] ABSTRACT

A system and method for automatically focusing a camera is disclosed wherein the outputs of a conventional spatial image correlator are sensed to develop a distance signal corresponding to object distance. The position of the camera lens is sensed to develop a focus signal indicative of lens position. The ratio of the distance signal to the focus signal is determined and compared to a predetermined value. When that ratio varies from the predetermined value, the lens is automatically re-positioned until correspondence occurs between the predetermined value and the ratio of the focus signal to the distance signal.

19 Claims, 7 Drawing Figures

AUTOMATIC FOCUS ADJUSTING SYSTEM

BACKGROUND OF THE INVENTION

The present invention relates to automatic focusing systems for use in optical instruments. More particularly, the present invention relates to an improved automatic focusing system for use in an optical instrument which has an electrically powered, adjustable objective lens.

Automatic focusing systems to which the present invention is directed generally employ two optical systems operating on the principle of spatial image correlation. A fixed, reference optical system is electrically interconnected with a scanning optical system and appropriate lens driving mechanism to selectively adjust the objective lens.

More specifically, an image of a remote subject is directed to one side of a sensor, such as that described in U.S. Pat. No. 4,002,899, by the fixed, reference optical system. Another image of the subject is directed to the other side of the sensor by the scanning optical system which sweeps through a predetermined angle. When the two images are received by the sensor, a continuous control signal is produced representative of subject distance. When the sensor determines that the images from both optical systems are coincident, a peak pulse is generated and the lens is stopped. However, under low light conditions, problems arise in automatically focusing the lens.

In an improved automatic focusing system utilizing the spatial image correlation principle described above, it has been proposed to mechanically interconnect a scanning optical system with an objective lens to produce a change in the field of orientation of the scanning optical system as a function of the change in the focus position of the lens. The orientation of the objective lens is further controlled by a signal generator mounted on the scanner drive to produce a second reference signal. A third reference signal is generated by employing sliding contacts on the scanner drive to generate a signal representative of the orientation of the scanning optical system. Appropriate circuitry is employed to compare the reference signals and to selectively energize a focus motor to adjust the lens position such that the angle of orientation of the scanning optical system at the point of spatial image correlation bisects the full scanning angle.

In the latter described device, object distance may be determined under conditions of low light and high speed scanning, thus providing more accurate focusing over a wide variety of conditions. However, the latter device utilizes a number of precision moving parts which, for some applications, may be undesirable from a cost and/or reliability standpoint. In addition, wear of the precision parts may introduce focusing problems. Hence, prior proposals for automatically focusing an optical system are not entirely satisfactory for a broad range of applications.

OBJECTS OF THE INVENTION

It is a general object of the invention to provide an improved automatic focusing system and method.

It is another specific object of the invention to provide an improved automatic focusing system of the spatial image correlation type.

A further object of the invention is to provide a novel method for automatically focusing an objective lens.

It is a more specific object of the invention to provide a reliable automatic focusing system utilizing spatial image correlation and achieving both accurate focus under various lighting conditions and simplicity of construction.

SUMMARY OF THE INVENTION

According to the method and apparatus of the invention, in a camera having a fixed optical system and a scanning optical system, a pair of control signals are generated by spatial image correlation. In response to the duration between the control signals, a distance signal is generated.

In the preferred embodiment, a lens position indicator is dimensioned and positioned to operatively engage, as a function of lens focus, a scanning reflector position indicator. The duration of operative contact between the indicators is monitored and a focus signal is produced.

The ratio between the focus and distance signals is compared to a predetermined value. Variations of that ratio from the predetermined value causes adjustment to the lens until the predetermined value is achieved, whereupon the lens is in proper focus.

BRIEF DESCRIPTION OF THE FIGURES

The above-stated objects and other objects of the invention are more particularly set forth in the following detailed description and in the accompanying drawings of which.

DESCRIPTION OF THE PREFERRED EMBODIMENT

Figure 1:
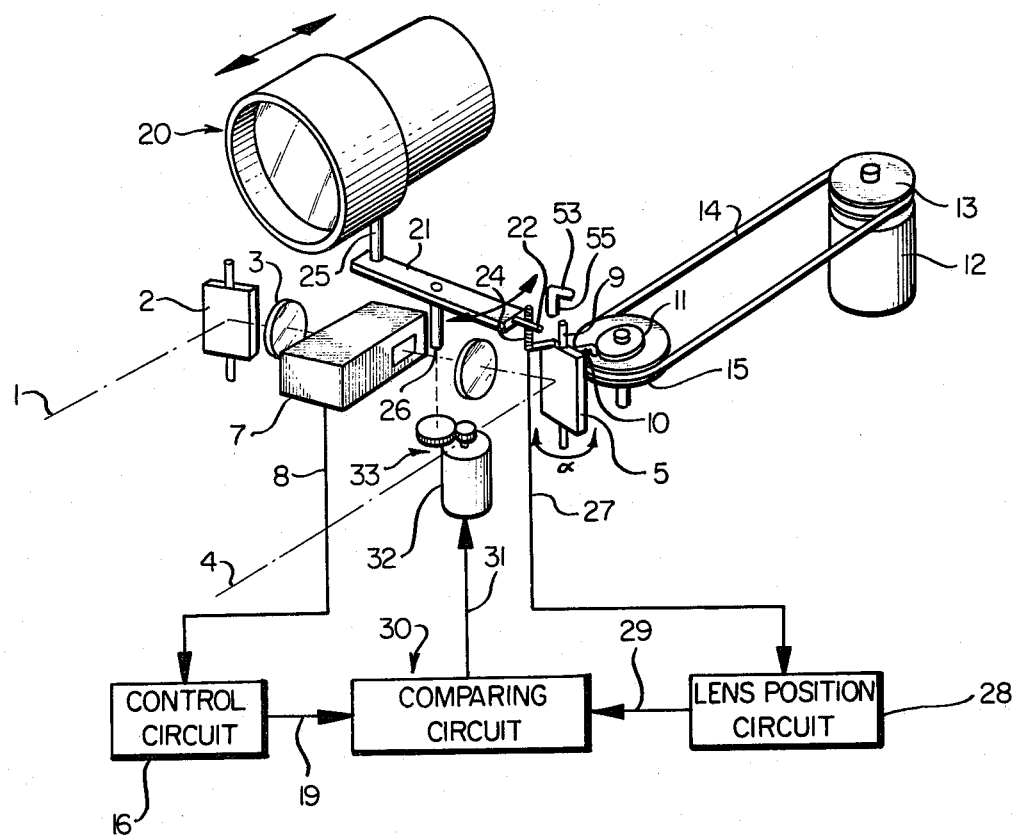
FIG. 1 is a schematic view showing an electrical and optical arrangement of an automatic focusing system according to the invention.

Referring now to FIG. 1, there is shown an improved automatic focusing system according to the present invention. As is conventional in spatial image correlation systems, there is provided a fixed optical system 1 which includes a fixed reflector 2 and a lens 3. Light received by the fixed optical system 1 is reflected by reflector 2 through lens 3 onto a sensor 7 which has a plurality of light responsive elements (CdS, for example) for generating electrical output corresponding to the pattern of light instant thereon.

A scanning optical system 4 includes a scanning reflector 5 and lens 6. The scanning reflector 5 oscillatably sweeps through an angle (alpha) of a fixed orientation, sweeping from a minimum focus setting to a maximum or infinity focus setting of the lens, and back again. Light incident on the scanning reflector 5 is directed through the lens 6 and onto the sensor 7 for impingement on a second plurality of light responsive elements.

When the light pattern received from the fixed optical system 1 corresponds to the light pattern received from scanning optical system 4, the images are spatially correlated and sensor 7 produces a control signal at lead 8 indicative of that condition. Such correlation occurs twice during each oscillatory scan of the reflector 5 so that a pair of control signals is generated during each such complete oscillatory scan as the scanning reflector 5 sweeps from nearest focus setting to infinity focus setting and back again. Those control signals generated by the sensor 7 are used to define a "distance" signal as will be described below.

To permit oscillatory movement of the scanning reflector 5, the latter is mounted about an axis 9. Movement of the reflector 5 about the axis 9 may be effected by various conventional devices. FIG. 1 shows one such device in the form of a link 10 suitably affixed to reflector 5 for engaging a rotating eccentric cam 11. Rotational movement of cam 11 is effected by a motor 12 which rotates a pulley 13 for driving a belt 14 and a second pulley 15, the latter of which carries the cam 11.

FIG. 5a is a graphic representation of a complete oscillatory scan of reflector 5 as a function of time where "I" represents the orientation of reflector 5 towards infinity and "N" represents the orientation towards the nearest focal point. During both the forward sweep F and return sweep R of a complete oscillatory scan of reflector 5, the sensor 7 generates a control signal at lead 8 when spatial image correlation is achieved between the images of fixed optical system 1 and scanning optical system 4. Spatial image correlation occurs at least twice during each complete oscillatory scan of scanning reflector 5, whereby two control signals 17 and 18 are generated as shown in FIG. 5b. The illustrated example corresponds to a condition where a subject is located at or beyond the infinite focal length of the lens. Under that condition, the control signals 17 and 18 are generated as the reflector 5 sweeps through the infinite (I) focal position, at which position spatial image correlation occurs.

Referring again to FIG. 1, the control circuit 16 receives the control signals 17 and 18 and interprets the time interval between them to develop a distance signal at lead 19 representative of that interval. That distance signal is employed to establish improved automatic focusing of a lens, as will be described below.

To utilize the distance signal developed at the lead 19 so as to accurately and simply focus the lens 20, the embodiment of FIG. 1 shows means coupled to the lens 20, illustrated here in the form of a detecting lever means 21, which carries a movable lens position indicator in the form of a lever contact 22. Adjustment to the focal condition of the lens correspondingly rotates the lever means 21, thereby moving the lever contact 22.

A scanning reflector position indicator, illustrated here as mechanical scanning reflector contact 24, moves in synchronism with the scanning reflector 5 and is positioned relative to the lever contact 22 to engage and disengage from operative contact therewith. As will be shown, the duration of operative contact is indicative of the lens position.

In response to operative contact between the contacts 22 and 24, means shown as a lens position circuit 28 generates at lead 29 a focus signal representative of the duration of contact between the contacts 22 and 24. Hence, the focus signal is representative of the focal position of the lens.

As stated above, the control circuit 16 is responsive to the control signals 17 and 18 to produce a distance signal representative of the interval between the control signals and is, therefore, a function of the focal distance of the subject from the lens. Circuitry for receiving both the focus signal on lead 19 and the distance signal on lead 29 is provided by a comparing circuit 30, the latter of which determines the ratio between the duration of the focus signal and the duration of the distance signal. If that ratio is greater or less than a predetermined value, the comparing circuit 30 energizes a lens adjustment mechanism for adjusting the position of the lens 20 until the ratio is substantially equal to a predetermined value, at which time the lens will be properly focused.

During lens adjustment, the lever 21 translates the motion of the lens to motion of the contact 22, whereupon the focus signal becomes larger or smaller as a function of the duration of operative contact between the contacts 22 and 24. The selective energizing of the lens adjustment mechanism continues until the value of the focus signal relative to the distance signal is substantially equal to the predetermined value, whereupon adjustment to the lens is discontinued. Accurate and simplified automatic focusing is thus achieved.

Referring more specifically to the apparatus by which the focus signal is generated, the detecting lever means 21 is shown coupled to the lens 20 so as to translate the position of the lens 20 to corresponding motion of the contact 22. Such coupling is effected by pivotable pin or pivot 25 carried by the lever 21 and fixed to the lens 20. Adjustment to objective lens 20 causes the lever 21 to correspondingly rotate about an axis 26, thereby displacing the position of the contact 22 as a function of lens position. Hence, the time and duration of contact between contacts 22 and 24 is a function of lens position.

Referring to the contact 24, it is preferably coupled to the scanning reflector 5 as shown to provide synchronous movement between the contact 24 and the reflector 5. In addition, the contact 24 is dimensioned and positioned relative to the contact 22 so that the contact 24 engages in and disengages from operative or physical contact with contact 22 as the reflector 5 oscillates.

Because the position of the lever means 21 and its contact 22 is a function of the position of lens 20, adjustment of the position of the lens 20 results in a corresponding variation in the position of the contact 22 relative to the arc alpha traversed by the contact 24 about axis 8. Hence, the time of operative contact or physical engagement between contacts 22 and 24 during the sweeps of scanning reflector 5 is a function of the position of the lens 20. For example, as the lens 20 is adjusted towards its nearest focal position, the lever means 21 rotates counterclockwise, and the contact 22 is rotated closer to the arc alpha traversed by the contact 24. Thus, a longer duration of operative contact or physical engagement between contacts 22 and 24 will result from the adjustment of lens 20 to a shorter focal length. On the other hand, when objective lens 20 is positioned at its infinite focal setting the contact 22 is at its farthest point from scanning reflector contact 24. This focal position of lens 20 will result in the shortest period of operative contact or physical engagement between contacts 22 and 24.

Preferably, both mechanical contacts 22 and 24 are resilient to enable flexing and continuous operative contact between the contacts 22 and 24 as the latter traverses an arc in synchronism with the oscillations of scanning reflector 5. In addition, electrically conducting springs for both the contacts 22 and 24 are preferred in order to complete an electrical path between the lens position circuit 28 and a source of electrical potential (not shown) to which the contact 22 may be coupled. Thus, when contacts 22 and 24 are operatively or physically engaged, a current is produced in lead 27 and received by the lens position circuit 28. However, for the duration of time during which contacts 22 and 24 are not engaged, no current will be directed through lead 27 to the lens position circuit 28.

The duration of time during which current is produced in lead 27 during one complete oscillatory scan is appropriately interpreted by the lens position circuit 28 to produce a focus signal at lead 29 indicative of that duration and representative of the focal position of lens 20. The focus signal produced at lead 29 may be a function of either the duration of current in lead 27 or, alternatively, the duration of time for which current is not produced.

FIG. 5d graphically represents the duration of time $t_5$ for which the current is not produced in lead 27. More specifically, $t_3$ represents the point in time for which contacts 22 and 24 are first opened during the forward scan of reflector 5, and $t_4$ represents the point in time for which contacts 22 and 24 are again closed during the return scan of a complete oscillatory scan of reflector 5. The focus signal produced by lens position circuit 28 may correspond to the interval $t_5$, depicting the duration for which no current is passed through leads 27. Alternatively, the interval that the contacts 22 and 24 are operatively or physically engaged, for which current is produced, may be employed by lens position circuit 28 to generate the focus signal.

Comparing circuit 30 may be any conventional comparator or the like capable of comparing the duration of the distance signal at lead 19 with duration of the focus signal at lead 29, to determine whether a predetermined ratio between the distance signal and the focus signal is present, and to produce an energizing output at lead 31 for the duration of time that the ratio between the distance and focus signals is above or below the predetermined value.

For example, comparing circuit 30 may consist of conventional electronic circuitry wherein a different polarity current or energizing output is produced dependent upon whether the ratio between the focus signal and distance signal is above or below the predetermined value. Any suitable predetermined value for the ratio between the focus signal and the distance signal may be employed. In the preferred embodiment, however, the value for the predetermined ratio is selected to be substantially equal to unity.

As described above, the energizing signal produced by comparing circuit 30 at lead 31 will have a polarity dependent upon whether the ratio between the distance and the focus signal is above or below the predetermined value. In this manner, a control motor 32 will be selectively energized to rotate gear system 33 clockwise or counterclockwise. Gear system 33 is operatively connected to the lever 21. When motor 32 is energized, the lever 21 rotates about axis 26. For example, when the polarity of the energizing output from comparing circuit 30 causes a clockwise rotation of lever 21, contact 22 is correspondingly moved farther away from the arc alpha traversed by the contact 24. Consequently, the time interval that contacts 22 and 24 are operatively engaged is shorter. The clockwise motion of the lever 21 also pulls and therefore adjusts lens 20 inwardly towards its infinity focal setting. An opposite polarity for energizing output at lead 31 produces counterclockwise rotation of the lever 21, an increased duration of operative engagement between contacts 22 and 24, and adjusts lens 20 outwardly towards its nearest focal setting.

Figure 5:
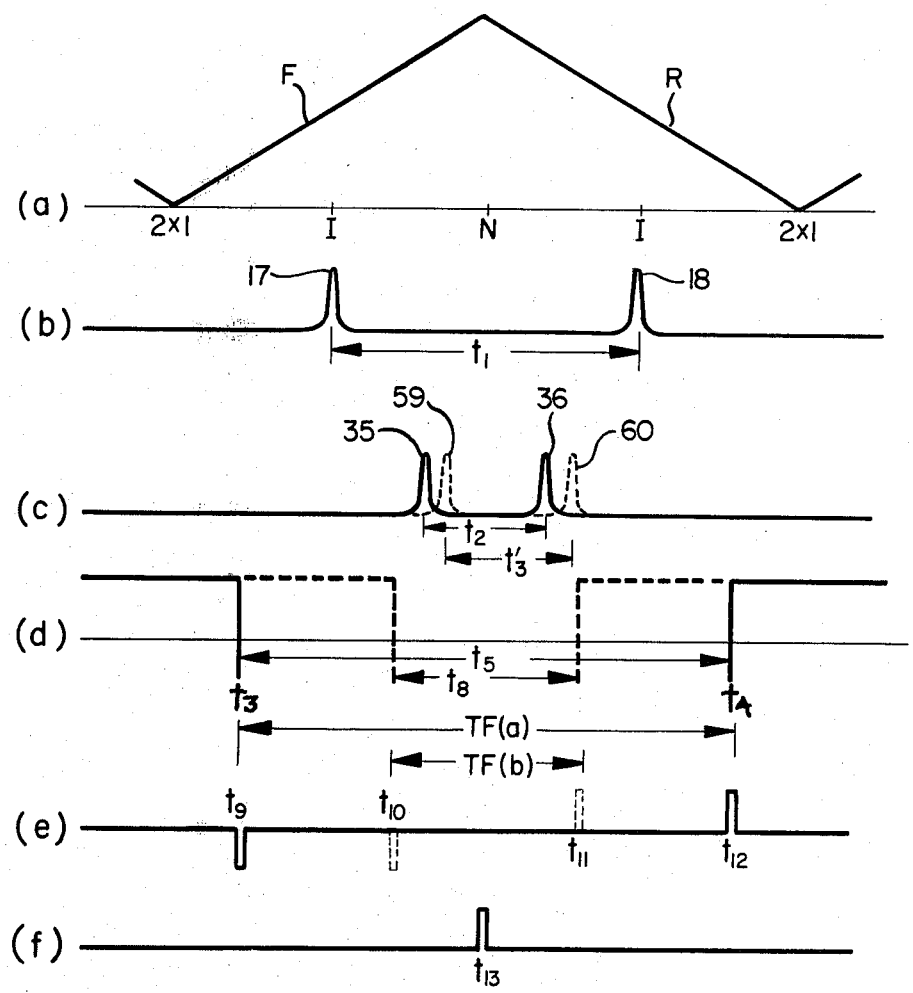
FIGS. 5a through 5f are wave forms illustrating the operation of the embodiments shown in FIGS. 1 through 4.

The automatic focusing operation method of the invention as illustrated by the embodiment shown in FIG. 1 will now be further explained with reference to FIG. 5. When lens 20 is in a proper focal position for the subject distance, the ratio between the distance signal and focus signal will have a value substantially equal to the predetermined ratio. More specifically, when the lens is properly focused on a subject at or beyond the infinite focus setting of the lens 20, the interval between the control signal 17 generated during the forward sweep F and the control signal 18 generated during the return sweep R of reflector 5 will result in a distance signal to focus signal ratio substantially equal to the predetermined value. FIG. 5b shows time interval $t_1$ between control signals 17 and 18 representing the distance signal produced by control circuit 16 at lead 19 for a subject at or beyond infinity. As the contact 24 traverses an arc alpha in synchronism with reflector 5, the duration of disengagement between contacts 22 and 24 is shown by interval $t_5$ in FIG. 5d. Circuit 28 "reads" the interval $t_5$ that contacts 22 and 24 are disengaged and produces a corresponding focus signal at lead 29.

FIG. 5c shows control signals 35 and 36 produced by the sensor 7 where the subject has moved from infinity as shown in FIG. 5b to a position between the nearest and infinite focal lengths of lens 20. Spatial image correlation will occur and a first control signal 35 will be produced by sensor 7 during the forward scan F of reflector 5 and a second signal 36 will be produced during the return scan R of reflector 5. Circuit 16 will detect a shorter duration between the control signals 35 and 36 at lead 8 and generate a shorter distance representative of the interval $t_2$. At substantially this point in time, comparing circuit 30 will detect this "out of focus condition" as a variation from the predetermined ratio between the now shorter distance signal (interval $t_2$) and the focus signal (interval $t_5$ of FIG. 5d). Comparing circuit 30 generates an energizing output at lead 31 of the correct polarity causing the control motor 32 to rotate lever 21 in a counterclockwise direction. Counterclockwise rotation of the lever 21 pulls lens 20 outwardly toward a shorter focal distance. Contact 22 will be rotated towards the arc alpha traversed by contact 24 about axis 9, increasing the duration of operative or physical engagement between contacts 22 and 24. FIG. 5d depicts the decreased interval of disengagement $t_8$ between contacts 22 and 24, as the lever 21 is rotated counterclockwise from the interval $t_5$, where the lens 20 is at its infinite focal position, to $t_8$ where the lens is focused on the subject.

Throughout the counterclockwise rotation of lever 21, circuit 30 will be continuously interpreting the ratio between the signals at leads 19 and 29. The energizing output will continue until the circuit 30 determines that the ratio between the distance and control signals has, once again, reached the predetermined value. At this point, the energizing output at lead 31 will cease, terminating the rotation of lever 21 and stopping adjustment to objective lens 20 in the proper focus for the subject.

Where the subject to be photographed moves away from lens 20, an energizing output of an opposite polarity will be produced and the movement of the various components will be the reverse of that described above. The lens 20 will be adjusted inwardly towards its infinite focal setting until the predetermined value for the ratio is achieved and proper automatic focusing is achieved.

The present invention is not limited by the particular circuitry involved as will be apparent to one of ordinary skill in the art. For example, conventional lens position circuitry 28 may be employed to produce a focus signal representing the duration of time that contacts 22 and 24 are operatively contacted or engaged or, in the alternative, disengaged. Comparing circuit 30 may be any conventional circuitry and may be "programmed" for any desired predetermined value for the ratio between the distance signal to the focus signal or vice versa.

Figure 6:
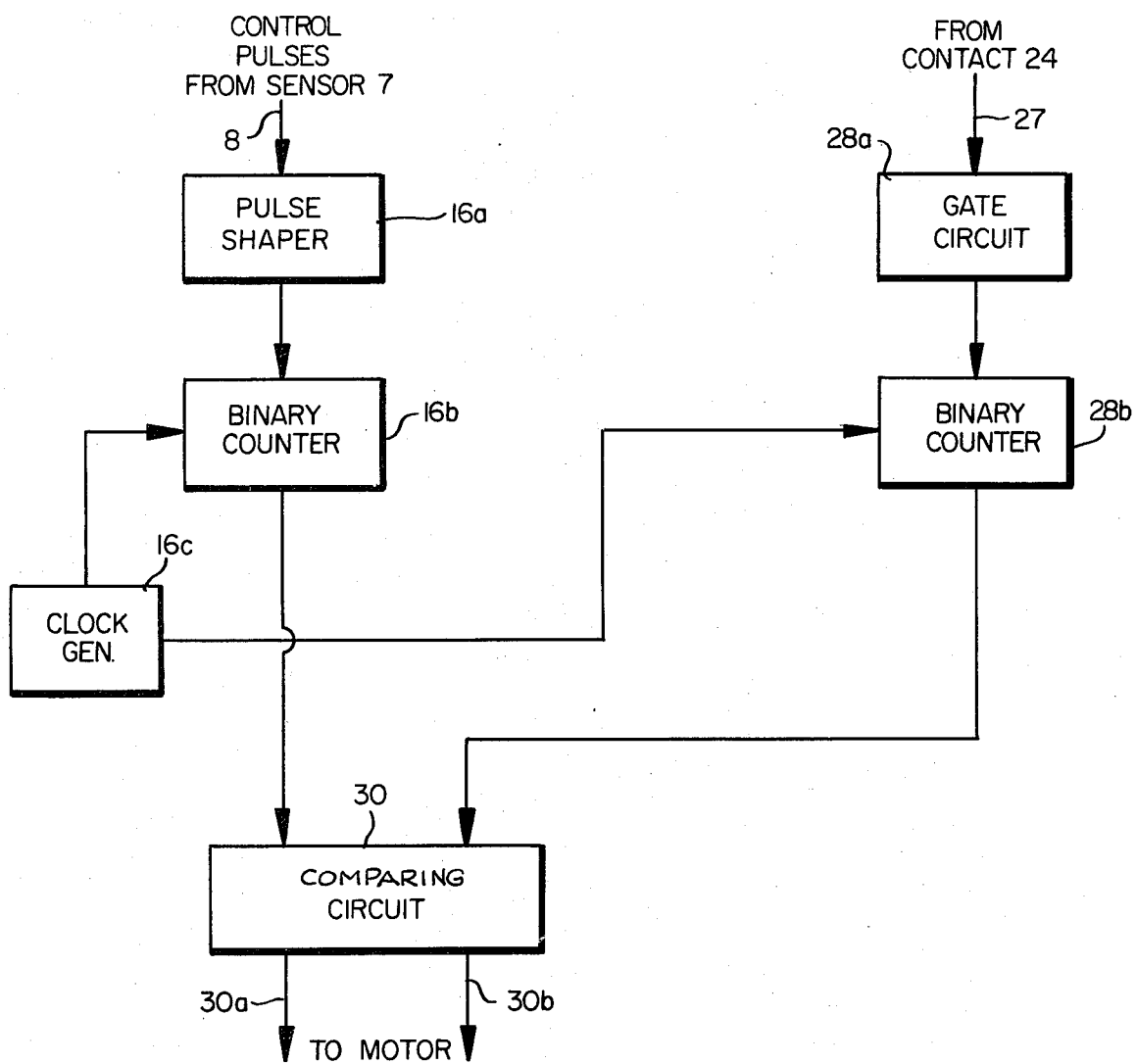
FIG. 6 illustrates a preferred embodiment of the control circuit and lens position circuit of FIG. 1.

An illustrative but preferred embodiment of the control circuit 16, the lens position circuit 28, and their connection to the comparing circuit 30 is depicted in FIG. 6. In this illustrated embodiment, the control circuit 16 includes a pulse shaper 16a receiving the control pulses from the sensor 7, a binary counter 16b, and a conventional clock generator 16c. The lens position circuit 28 may include a gate circuit 28a coupled via lead 27 to the contact 24, and a binary counter 28b receiving the output of the gate circuit 28a. The outputs of the counters 16b and 28b are applied as inputs to the comparing circuit 30.

The pulse shaper 16a is conventional in construction and merely "squares" the control pulses received from the sensor 7 and applies the "squared" control pulses to the counter 16b.

The binary counter 16b may be a conventional seven bit binary counter for counting clock pulses generated by the clock generator 16c. The interconnection between the counter 16b and 16a is such that the counter 16b starts counting clock pulses upon receipt of the first of a pair of pulses from the pulse shaper 16a and stops counting clock pulses upon receipt of the second pulse from the pulse shaper. Such an arrangement is well known to those skilled in the art. Suffice it to say that the count stored in the counter 16b is representative of the interval between a pair of control pulses from the sensor 7. That stored count is applied as one input to the comparing circuit 30.

The gate circuit 28a may also be of any conventional construction for enabling the counter 28b in response to a signal at the lead 27 indicating operative contact between the contacts 22 and 24. In response, the counter 28b, a conventional seven bit binary counter, starts counting clock pulses from the clock generator 16c. When the contacts 22 and 24 are disengage, the gate circuit 28a inhibits the counter 28b from further counting. Hence, the counter 28b stores a count representative of the duration of operative contact between the contacts 22 and 24. That stored count is applied as another input to the comparing circuit 30.

The comparing circuit 30 determines the ratio of the counts received from the counters 16b and 28b, and compares that ratio to a predetermined ratio (unity, preferably). If that ratio is not equal to the predetermined ratio, high and low signals are developed at the lead 30a and 30b (corresponding to lead 31 of FIG. 1) for driving the motor 32 to adjust the position of the lens.

In some applications, it may be desirable to include a storage counter between the pulse shaper 16a and the counter 16b for temporarily storing the squared control pulses. The inclusion of the storage counter avoids errors caused by three dimensional subjects which create more than one control pulse during a scan of the subject in a given scan direction.

Figure 7:
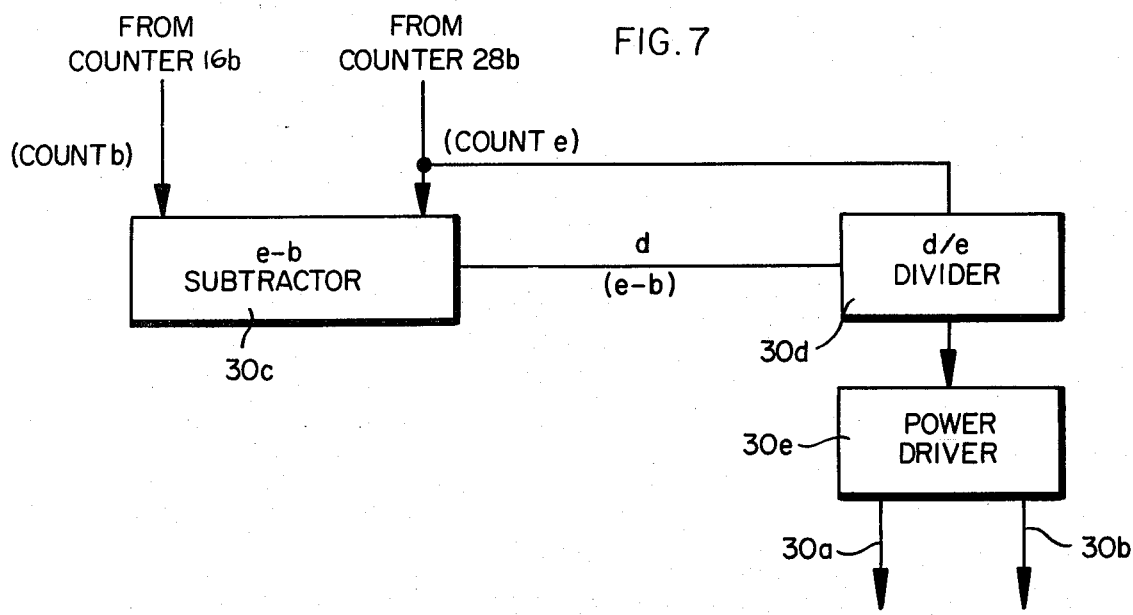
FIG. 7 illustrates a preferred embodiment of the comparing circuit 30 of FIG. 1.

The comparing circuit 30 may take a variety of forms, a preferred one of which is illustrated in FIG. 7. As shown, the comparing circuit 30 may include a conventional subtractor 30c, a conventional divider 30d, and a conventional power driver 30e. The subtractor 30c receives the count stored in the counter 16b (count b), the count stored in the counter 28b (count e), and subtracts count b from count e. The resultant signal d (count e minus b) is applied as an input to the divider 30d, the latter of which also receives the count e from the counter 28b. The divider 30d is arranged to divide the resultant d by the count e so that its output corresponds to d/e or (e−b)/e. The output of the divider 30d can be written as 1−(b/e) to demonstrate that the output of the divider 30d is equal to zero when count b is equal to count e; that is, the divider 30d provides no output to the power drive 30e when proper focus is established. When count b is greater or less than count e, the divider 30 provides an input to the power driver 30e for developing appropriate outputs at leads 30a and 30b for adjusting the lens to its proper focal position.

Figure 2:
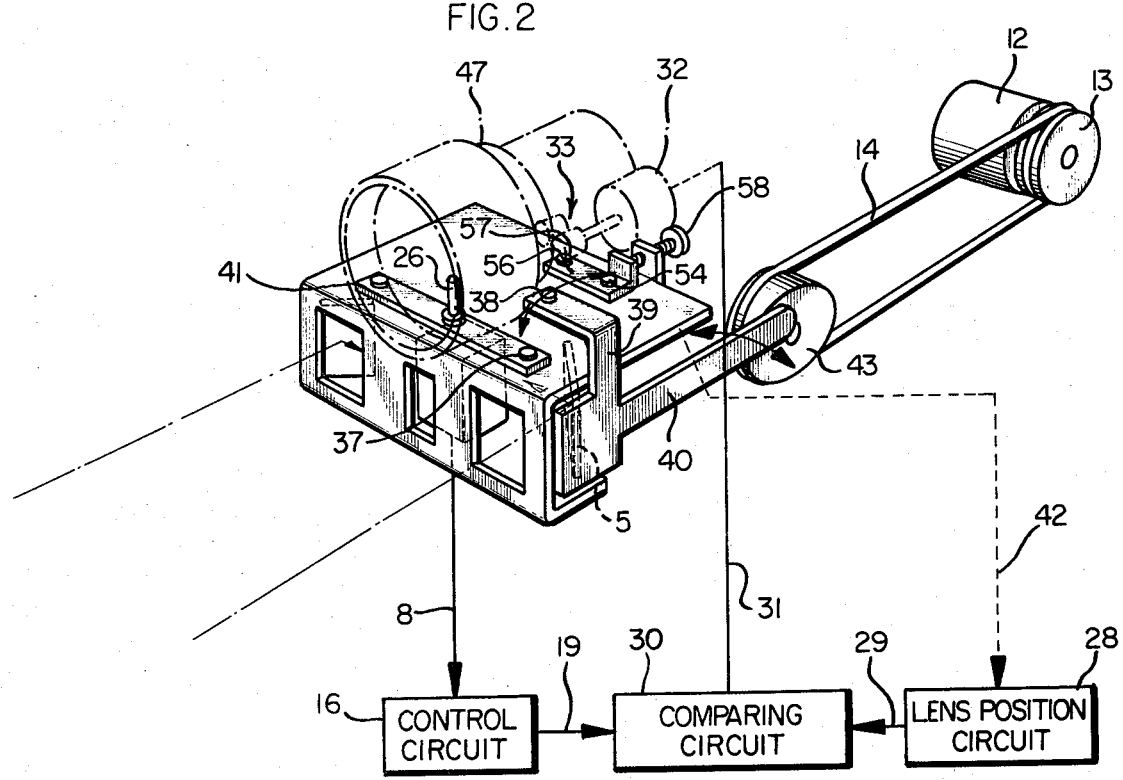
FIG. 2 is a schematic view showing an alternative embodiment for the electrical and optical arrangement of the invention.
Figure 3:
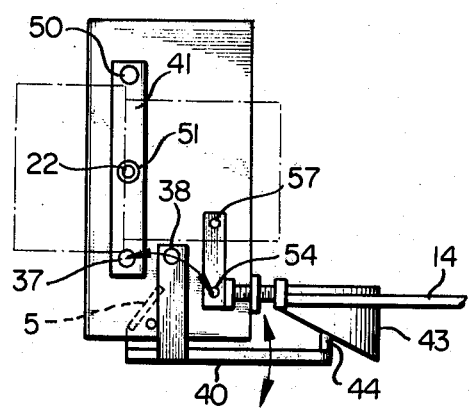
FIG. 3 is a top view of a portion of FIG. 2 more specifically illustrating alternative contacts and an alternative embodiment for positioning the means coupled to the lens.
Figure 4:
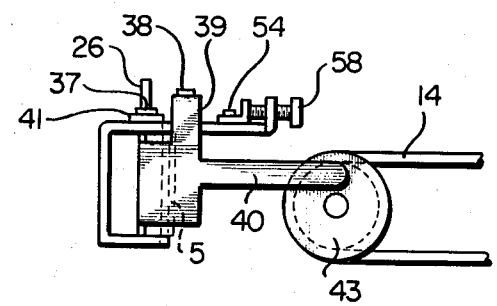
FIG. 4 is a side view of a portion of FIG. 3 further illustrating the alternative embodiment for the scanning optical system and position indicator.

Referring now to FIGS. 2, 3, and 4, there is shown another embodiment of this invention wherein automatic focusing is achieved by the method as substantially described above, except that the scanning reflector position indicator and the lens position indicator are optical contacts, as illustrated by elements 38 and 37, respectively. These optical contacts replace the mechanical lever contact 22 and mechanical reflector contact 24 and are preferably employed where digital electronic circuitry is used.

As is shown in FIGS. 2 and 3, a lateral extension 39 of an arm 40 carries the scanning reflector position indicator, illustrated by optical contact 38. FIG. 2 shows the optical detecting lever contact 37 carried by a means coupled to the lens, illustrated here as lever means 41. One of the optical contacts 37 and 38 may be a photoconductive cell (such as CdS) and the other will be a light source to energize the photoconductive element. Extension 39 of arm 40 is dimensioned and positioned to allow contacts 37 and 38 to pass over or under one another as reflector 5 oscillates. Operative contact occurs when the photo-conductive contact is energized by the light source contact. The light source contact is suitably powered by appropriate leads (not shown) to generate light to energize the photo-conductive contact. Operative contact of elements 37 and 38 will cause the photo cell contact to generate a position indicator signal at lead 42, shown in dashed lines in FIG. 2, to indicate that the lead 42 is coupled either to contact 37 or contact 38, whichever is chosen to be the photoconductive element. The lead 42 carries the indicator signal to lens position circuitry 28.

The operation of the optical contact embodiment of the present invention will now be described in more detail. Arm 40 transmits the motion produced by eccentric cam 43 to oscillate reflector 5. One end of the arm 40 is provided with cam follower 44 which is suitably biased towards and slidably rides upon eccentric cam 43. Oscillatory motion is translated to reflector 5 by the opposite end of arm 40 which is suitably attached to reflector 5 as is shown in FIG. 3. During the forward scan of reflector 5, operative contact will be established when optical contacts 37 and 38 are aligned at time $t_9$ (FIG. 5e) and an indicator signal having either positive or negative polarity will be produced at lead 42. A second signal of opposite polarity at lead 42 will be produced at time $t_{12}$ indicative of operative contact during the return sweep of scanning reflector 5. Lens position circuit 28 receives the signals on the lead 42 and a focus signal is produced at lead 29 as a function of the interval between the indicator signals produced at $t_9$ in the forward scan and that produced at $t_{12}$ in the return scan of reflector 5. Conventional circuitry may be employed for lens position circuit 28 to detect the duration of time between signals of opposite polarity at $t_9$ and $t_{12}$ and to produce a focus signal representative of the interval TF(a) at lead 29 for each complete oscillatory scan of reflector 5. The duration of the latter focus signal is a function of the lens position and the corresponding location of the lens position indicator as translated by the lever 41. For example, outward adjustment of objective lens 20 towards a nearer focal distance produces counterclockwise rotation of detecting lever means 41. Consequently, the duration of time between the operative contact of optical contacts 37 and 38 will be reduced as shown by the interval TF(b) representing the duration between signals produced at $t_{10}$ and $t_{11}$ of FIG. 5e.

The duration of the indicator signal produced by the photo cell while contacts 37 and 38 are operatively engaged will be a function of the surface area of the photo-conductive element and light source. It is preferable to arrange optical contacts 37 and 38 so that the duration of operative contact is approximately two milliseconds. The shorter the duration of operative engagement between contacts 37 and 38, the more defined will be the signal produced therefrom. A width or duration of approximately two milliseconds is preferable since the preferable duration of one complete oscillatory scan of reflector 5 is approximately 110 milliseconds.

FIG. 2 also shows a control motor 32 and a gear system 33 appropriately positioned to engage a focus collar gear 47 located directly on the lens 20. The lever 41 rotates about axis 26 in this embodiment and transmits the focus position of lens 20 as it does in the alternative embodiment as shown in FIG. 1.

FIG. 3 illustrates another arrangement for the lever 41 in which the latter rotates about axis 50 near one end and carries a lens position indicator, illustrated as optical contact 37, near the opposite end of detecting lever means 41. Suitable connecting means 51 is connected to lens 20 and may be disposed between the ends of the lever 41.

According to another aspect of the invention, a third reference contact is positioned and dimensioned to provide for operative engagement with the scanning reflector position indicator when the scanning reflector is oriented towards its nearest focal distance during a complete oscillatory scan. By including a third reference contact, a reference signal is developed for indicating to the control circuit 16 the direction of motion of the scanning reflector and to thereby indicate which successive control pulses the control circuit is to operate on for determining their separation in time.

Referring to FIG. 1, a third contact 53 is shown carried by a support pin 55. By suitably locating the pin 55, the contact 53 makes operative contact with the contact 24 when the scanning reflector 5 is oriented at the nearest focal distance of the lens. As shown in FIG. 5f, a pulse is generated at time $t_{13}$ when operative contact is made between contacts 24 and 53, and that pulse is coupled by any suitable coupling (not shown) to the control circuit 16. The reception of the pulse generated at time $t_{13}$ provides a frame of reference for the lens control circuit 16 for identifying successive control signals 17 and 18 or 35 and 36 (FIGS. 5b and 5c) for which the interval $t_1$ or $t_2$ is to be measured by circuit 16 to provide the distance signal at lead 19.

In FIGS. 2, 3 and 4, a third optical contact 54 is employed in place of the mechanical contact 53. The optical contact 54 may be either a photoconductive cell or a light source to correspondingly enable operative engagement with optical scanning reflector contact 38. For example, when optical scanning reflector contact 38 is a light source, third optical contact 54 will be a photoconductive cell or vice versa. The contact 54 is supported by suitable means illustrated as a bracket 56, about a pivot 57, positioned at the opposite end. Suitable adjustment of the position of contact 54 is effected by adjustment screw 58 which will rotate bracket 56 inwardly or outwardly about pivot 57. As with the embodiment shown in FIG. 1, this adjustment allows for operative engagement between 38 and 54 to be achieved at the point when scanning reflector 5 is oriented towards the nearest focal position.

Turning now to FIG. 5c, an advantage of the closed loop system of the present invention is depicted by pulses 59 and 60 shown in phantom. The pulses 59 and 60 are shifted along the time axis due to a delayed response relative to the non-delayed pulses 35 and 36. A delayed response by sensor 7 may arise, for example, due to variations in the brightness of the light level of the subject to be focused upon. However, even though the point in time at which a control signal is generated may vary due to variations in the brightness of the subject to be photographed, the duration between successive focus signals remains substantially constant as shown by $t'_3$. Hence, the closed loop system of the present invention is highly accurate and independent of the brightness of the subject as a result of the fact that any response delay is relative and therefore does not quantitatively affect the distance signal.

Although the invention has been described in terms of a specific preferred structure and focusing method, it will be obvious to those skilled in the art that many variations and alterations may be made without departing from the spirit and scope of the invention. Accordingly, it is intended that all such modifications and alterations be included within the scope of the invention as defined by the appended claims.

What is claimed is:

1. In an optical instrument having an adjustment mechanism for adjusting the focus of an objective lens and an automatic focusing system in which a scanner driver oscillates a scanning reflector about an axis for imaging a subject on a sensor, and in which a fixed reflector images the subject on the sensor for generating at least a pair of control signals during each complete oscillatory scan of the reflector when spatial image correlation occurs, and including control circuitry for selectively energizing the adjustment mechanism in response to the control signals, the improvement comprising:

means receiving the control signals for generating a distance signal representative of the interval between said control signals;

means for monitoring the position of the lens and the position of the scanning reflector so as to develop first and second lens position signals indicative of the position of the lens relative to the position of the scanning reflector during the forward and return scans of the scanning reflector;

means receiving the lens position signals for generating a focus signal indicative of the interval between said first and second lens position signals; and means for comparing the ratio of the distance signal and the focus signal to a predetermined ratio and for automatically adjusting the position of the lens until the ratio of the distance signal to the focus signal is substantially equal to said predetermined ratio.

2. The improvement as set forth in claim 1 wherein said means for monitoring the position of the lens and the scanning reflector includes a lens position indicator coupled to the lens for movement as a function of lens position, and a reflector position indicator operatively coupled to and movable in synchronism with the scanning reflector and positioned relative to said lens position indicator to engage in and disengage from operative contact with said lens position indicator to thereby generate the first and second lens position signals such that the interval between the first and second lens position signals is substantially equal to the duration of operative contact between said lens position indicator and said reflector position indicator, thereby causing said interval to be a function of lens position.

3. The improvement as set forth in claim 2 wherein at least one of said lens position indicator and said scanning reflector position indicator includes a resilient mechanical contact to thereby enable said contact to maintain operative contact between said indicators after their initial contact as said scanning reflector indicator oscillates in synchronism with the scanning reflector.

4. The improvement as set forth in claim 3 wherein said means for generating a focus signal generates a focus signal representative of the duration of physical engagement between said indicators.

5. The improvement as set forth in claim 3 wherein said means for generating a focus signal generates a focus signal representative of the duration that said indicators are not physically engaged.

6. The improvement as set forth in claim 3 wherein said mechanical contact is a spring to enable said contact to maintain operative contact between said indicators.

7. The improvement as set forth in claim 2 wherein said lens position indicator and scanning reflector position indicator include optical contacts comprising a light source associated with one of said indicators and a photo cell associated with the other of said indicators for signaling coincidence between said photo cell and said light source and for indicating operative contact between said lens position indicator and said reflector position indicator.

8. The improvement as set forth in claim 7 wherein said optical contacts are selected to engage in mutually operative contact for approximately two milliseconds during the forward and return sweep of said scanning reflector.

9. The improvement as set forth in claim 1 wherein said predetermined ratio between said focus signal and said distance signal is selected to be substantially equal to unity.

10. The improvement as set forth in claim 2 further including means for operatively contacting said scanning reflector position indicator at the point when said scanning reflector is oriented toward the nearest focal distance of the objective lens to provide a reference signal to said distance signal generator to indicate the direction of motion of said scanning reflector and to thereby indicate which successive control signals are to be operated on for determining their separation in time.

11. The improvement as set forth in claim 10 wherein said means for operatively contacting said scanning reflector position indicator comprises a mechanical contact.

12. The improvement as set forth in claim 10 wherein said means for operatively contacting said scanning reflector position indicator comprises an optical contact.

13. In an optical instrument having an adjustment mechanism for adjusting the focus of an objective lens and an automatic focusing system in which a scanner driver oscillates a scanning reflector about an axis for imaging a subject on a sensor, and in which a fixed reflector images the subject on the sensor for generating at least a pair of control signals during each complete oscillatory scan of the reflector when spatial image correlation occurs, and including control circuitry for selectively energizing the adjustment mechanism in response to the control signals, the improvement comprising:

means coupled to the lens and carrying a lens spring contact for displacement of said lens contact as a function of lens position;

a resilient spring contact operatively coupled to and movable in synchronism with the scanning reflector, and positioned relative to said lens spring contact to engage in and disengage from operative contact with said lens spring contact such that the duration of operative contact is a function of lens position;

means responsive to operative contact between said lens spring contact and said reflector spring contact for generating a focus signal representative of the duration of operative contact between said contacts;

means responsive to the control signals for generating a distance signal representative of the time interval between control signals generated in a complete oscillator scan of the scanning reflector; and means for receiving said focus signal and said distance signal, for determining the ratio therebetween, and for energizing the adjustment mechanism until said ratio substantially equals a predetermined value, whereby motion of the lens is translated by said spring contacts to a different focus signal until said predetermined ratio is achieved and the lens is stopped in a focused condition.

14. In an optical instrument having an adjustment mechanism for adjusting the focus of an objective lens and an automatic focusing system in which a scanner driver oscillates a scanning reflector about an axis for imaging a subject on the sensor, and in which a fixed reflector images the subject on the sensor for generating at least a pair of control signals during each complete oscillatory scan of the reflector when spatial image correlation occurs, and including control circuitry for selectively energizing the adjustment mechanism in response to the control signals, the improvement comprising:

means coupled to the lens and carrying a photo cell indicator for displacement of said photo cell as a function of lens position;

a light emitting indicator operatively coupled to and movable in synchronism with the scanning reflector and positioned relative to said photo cell indicator to engage in and disengage from operative contact with said photo cell indicator and to produce a position indicator signal upon operative contact between said indicators;

means responsive to successive position indicator signals for generating a focus signal representative of the interval between said position indicator signals;

means responsive to the control signals for generating a distance signal representative of the time interval between control signals generated in a complete oscillatory scan of the scanning reflector; and means for receiving said focus signal and said distance signal, for determining the ratio therebetween, and for energizing the adjustment mechanism until said ratio substantially equals a predetermined value, whereby motion of the lens is translated by said photo cell indicator and said light emitting indicator to a different focus signal until said predetermined ratio is achieved and the lens is stopped in a focused condition.

15. In an optical instrument having an adjustable lens, a stationary optical system and a scanning optical system including a scanning reflector adapted to make forward and return scans between the nearest and infinite focal distance of the lens, a method of automatically focusing the lens, comprising:

generating a pair of control signals as correlation occurs between an image received by a stationary optical system and images received on the forward and return scans of the scanning optical system;

generating a distance signal representative of the interval between said control signals;

monitoring the position of the lens and the position of the scanning reflector so as to develop first and second lens position signals indicative of the position of the lens relative to the position of the scanning reflector during the forward and return scans of the scanning reflector;

generating a focus signal indicative of the interval between said first and second lens position signals;

comparing the ratio of the distance signal and the focus signal to a predetermined ratio; and automatically adjusting the position of the lens until the ratio of the distance signal to the focus signal is substantially equal to said predetermined ratio.

16. A method as set forth in claim 15 wherein said predetermined ratio is selected to be unity.

17. A method as set forth in claim 15 wherein the step of generating a distance signal includes generating clock pulses and counting clock pulses generated in the interval between the control signals developed during the forward and return scans of the scanning optical system, the number of counted clock pulses constituting a first count representing the interval between control pulses.

18. A method as set forth in claim 17 wherein the step of generating the focus signal includes counting the number of clock pulses generated in the interval between the first and second lens position signals, the number of clock pulses so counted constituting a second count representing the interval between the first and second lens position signals.

19. A method as set forth in claim 18 wherein said comparing step includes subtracting the first count from the second count and dividing the resultant by the second count, whereby the ratio of the distance signal and the focus signal is compared to a predetermined ratio of unity.

* * * * *